US012441931B2

(12) United States Patent
Gizzatov et al.

(10) Patent No.: US 12,441,931 B2
(45) Date of Patent: Oct. 14, 2025

(54) SULFONATION METHOD FOR EFFICIENT SCALE-UP SYNTHESIS OF JANUS CARBON NANOMATERIALS FROM BIOMASS WASTE

(71) Applicant: ARAMCO SERVICES COMPANY, Houston, TX (US)

(72) Inventors: Ayrat Gizzatov, Winchester, MA (US); Wei Wang, Quincy, MA (US); Sehoon Chang, Boston, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/605,552

(22) Filed: Mar. 14, 2024

(65) Prior Publication Data

US 2025/0289993 A1   Sep. 18, 2025

(51) Int. Cl.
  *C09K 8/584* (2006.01)
  *C01B 32/05* (2017.01)
  *E21B 43/16* (2006.01)
(52) U.S. Cl.
  CPC ............. *C09K 8/584* (2013.01); *C01B 32/05* (2017.08); *E21B 43/16* (2013.01);
  (Continued)
(58) Field of Classification Search
  None
  See application file for complete search history.

(56) References Cited

U.S. PATENT DOCUMENTS 7,662,747 B2    2/2010  De Ruiter
10,358,595 B2*  7/2019  McDaniel ............... E21B 43/26
(Continued)

FOREIGN PATENT DOCUMENTS

CN    101670299 B    1/2012
CN    103332687 A    10/2013
(Continued)

OTHER PUBLICATIONS

Yu; "Sulfonated coal-based solid acid catalyst synthesis and esterification intensification under ultrasound irradiation"; Fuel; vol. 208, 2017; p. 101-110. (Year: 2017).*
(Continued)

*Primary Examiner* — Andrew Sue-Ako
(74) *Attorney, Agent, or Firm* — Osha Bergman Watanabe & Burton LLP

(57) ABSTRACT

A method of preparing an enhanced oil recovery composition includes carbonizing a biomass waste material to provide carbon microparticles, functionalizing the carbon microparticles with a $SO_3$-containing gas such that the carbon microparticles include a hydrophilic surface, and grinding the carbon microparticles to provide carbon nanoparticles. The carbon nanoparticles include a hydrophilic surface and a hydrophobic surface. A method of enhanced oil recovery includes introducing an enhanced oil recovery composition including a carbon nanoparticle functionalized with a $SO_3$-containing gas and including a hydrophilic and hydrophobic surface into a hydrocarbon-bearing formation. The method includes displacing hydrocarbons from the hydrocarbon-bearing formation and recovering the hydrocarbons.

16 Claims, 5 Drawing Sheets

(52) U.S. Cl.
CPC ...... *C01P 2002/82* (2013.01); *C01P 2004/61* (2013.01); *C01P 2004/62* (2013.01); *C01P 2004/64* (2013.01); *C09K 2208/10* (2013.01)

(56) References Cited

U.S. PATENT DOCUMENTS

| | | | |
|---|---|---|---|
| 2015/0021525 A1* | 1/2015 | Naskar | H01M 4/587 |
| | | | 252/502 |
| 2015/0218921 A1 | 8/2015 | Suresh et al. | |
| 2017/0240792 A1 | 8/2017 | Monclin et al. | |
| 2018/0320049 A1 | 11/2018 | Shumway et al. | |
| 2018/0346798 A1 | 12/2018 | Abdel-Fattah et al. | |
| 2019/0198862 A1 | 6/2019 | Campbell et al. | |
| 2020/0056086 A1 | 2/2020 | Haq et al. | |
| 2020/0290879 A1 | 9/2020 | Chang et al. | |
| 2020/0377820 A1* | 12/2020 | Basheer | B01J 37/20 |
| 2021/0023533 A1 | 1/2021 | Awadh et al. | |
| 2022/0025248 A1 | 1/2022 | Wang et al. | |
| 2024/0166939 A1 | 5/2024 | Wang et al. | |

FOREIGN PATENT DOCUMENTS

| | | |
|---|---|---|
| CN | 104098083 A | 10/2014 |
| CN | 104650864 A | 5/2015 |
| CN | 105439123 A | 3/2016 |
| CN | 107892291 A | 4/2018 |
| CN | 108342213 A | 7/2018 |
| CN | 108940192 A | 12/2018 |
| CN | 108946721 A | 12/2018 |
| CN | 108993393 A | 12/2018 |
| CN | 110105941 A | 8/2019 |
| CN | 110872498 B | 11/2021 |
| CN | 113773815 A | 12/2021 |
| CN | 114259984 A | 4/2022 |
| CN | 115924886 A | 4/2023 |
| DE | 102016101215 A1 | 6/2017 |
| EP | 2451744 B1 | 5/2012 |
| GB | 1406378 A | 9/1975 |
| TW | 1537208 B | 6/2016 |
| WO | 2004073094 A1 | 8/2004 |
| WO | 2007093725 A2 | 8/2007 |
| WO | 201411460 A1 | 1/2014 |
| WO | 2014011457 A1 | 1/2014 |
| WO | 2014011462 A1 | 1/2014 |
| WO | 2016064718 A1 | 4/2016 |
| WO | 2016065718 A1 | 5/2016 |
| WO | 2023018544 A1 | 2/2023 |
| WO | 2025042599 A1 | 2/2025 |

OTHER PUBLICATIONS

J. Liu et al., "Carbon Dots: A New Type of Carbon-Based Nanomaterial with Wide Applications", ACS Cent. Sci. 2020, vol. 6, pp. 2179-2195 (17 pages).
Y. Wu et al., "In-situ synthesis of high thermal stability and salt resistance carbon dots for injection pressure reduction and enhanced oil recovery", Nano Research, Dec. 5, 2022, pp. 1-8 (8 pages).
K. Song, "Application of Biomass Derived Materials in Nanocomposites and Drilling Fluids", LSU Doctoral Dissertations. Published Aug. 2016 , (145 pages).
Gao, Jie, et al., "Degradation of Trichloroethene with a Novel Ball Milled Fe—C Nanocomposite", Journal of Hazardous Materials, ScienceDirect, Elsevier B.V., vol. 300, 2015, pp. 443-450 (8 pages).
Gong, Jiang, et al., "Recent progress in controlled carbonization of (waste) polymers", Progress in Polymer Science, 2019 (79 pages).
Hu, Yaoping, et al., "Green and size-controllable synthesis of photoluminescent carbon nanoparticles from waste plastic bags", RSC Advances, Royal Society of Chemistry, vol. 4, 2014, pp. 47169-47176 (8 pages).
Li, Yuyang, et al., "A novel nanofluid based on fluorescent carbon nanoparticles for enhanced oil recovery", Industrial & Engineering Chemistry Research, ACS Publications, Oct. 2017 (23 pages).
Yoshioka, Toshiaki, et al., "Hydrolysis of Waste PET by Sulfuric Acid at 150°C for a Chemical Recycling", Journal of Applied Polymer Science, John Wiley & Sons, Inc., vol. 52, 1994, pp. 1353-1355 (3 pages).
Non-Final Office Action issued in corresponding U.S. Appl. No. 18/056,993, mailed Apr. 29, 2024 (12 pages).
Abd Hamid, Sharifah Bee et al., "Green Catalytic Approach for the Synthesis of Functionalized Nanocellulose from Palm Tree Biomass"; Advanced Materials Research; vol. 925; pp. 57-61; Apr. 2014 (5 pages).
Sankar, S. et al., "Biomass-derived ultrathin mesoporous graphitic carbon nanoflakes as stable electrode material for high-performance supercapacitors"; Materials & Design; vol. 169, Article 107688; pp. 1-9; May 5, 2019 (9 pages).
Chai, Y H et al., "Comparison of rheological properties of graphene / carbon nanotube hydrogenated oil based biodegradable drilling fluid"; IOP Conference Series: Materials Science and Engineering; vol. 206, Article 012042, 29th Symposium of Malaysian Chemical Engineers (SOMChE) 2016; pp. 1-9; 2017 (9 pages).
Mahat, Nur Akma et al., "Transformation of oil palm biomass to optical carbon quantum dots by carbonisation-activation and low temperature hydrothermal processes"; Diamond and Related Materials; vol. 102, Article 107660; Feb. 2020 (28 pages).
Kang, Chao et al., "A Review of Carbon Dots Produced from Biomass Wastes"; Nanomaterials; vol. 10, Issue 11, Article 2316; pp. 1-24; Nov. 2020 (24 pages).
Chausali, Neha et al., "Nanobiochar and biochar based noncomposites: Advances and applications"; Journal of Agriculture and Food Research; vol. 5, Article 100191; pp. 1-12; Sep. 2021 (12 pages).
Liu, Zhixin et al., "Modified biochar: synthesis and mechanism for removal of environmental heavy metals"; Carbon Research; vol. 1, Issue 1, Article 8; pp. 1-21; Dec. 2022 (21 pages).
Non-Final Office Action issued in corresponding U.S. Appl. No. 18/056,993, mailed Sep. 19, 2023 (15 pages).
Final Office Action issued in corresponding U.S. Appl. No. 18/056,993, mailed Dec. 28, 2023 (10 pages).
Valentina G. Matveeva et al., "From renewable biomass to nanomaterials: Does biomass origin matter?" Progress in Materials Science, Jun. 28, 2022, vol. 130, 100999 (41 pages).
International Search Report and Written Opinion issued in corresponding International Application No. PCT/US2024/041631, dated Nov. 25, 2024 (15 pages).
International Search Report issued for corresponding international patent application No. PCT/US2025/019739, mailed May 27, 2025 (6 pages).
Written Opinion issued for corresponding international patent application No. PCT/US2025/019739, mailed May 27, 2025 (10 pages).
International Search Report issued in corresponding International Application No. PCT/US2025/019746; mailed Jun. 6, 2025 (6 pages).
Written Opinion of the International Searching Authority issued in corresponding International Application No. PCT/US2025/019746; dated Jun. 6, 2025 (7 pages).

\* cited by examiner

SULFONATION METHOD FOR EFFICIENT SCALE-UP SYNTHESIS OF JANUS CARBON NANOMATERIALS FROM BIOMASS WASTE

BACKGROUND

Among the major challenges in the modern world, meeting energy needs and protecting the environment are two of the top ranked. In addressing our ever-growing energy needs, conventional fossil fuels are still the primary energy source; however, they are becoming harder to extract from mature fields. Recent developments in petroleum engineering research have shown that nanomaterials may be used in water flooding techniques in oilfields, often referred to as nanofluid flooding, to improve oil displacement. One advantage of nanofluids arises from the small size of the included nanomaterials, that are able to alter the wettability of the reservoir rocks and/or change interfacial tension (IFT) at water-oil interface to increase oil recovery. However, various constraints influence the fluid-fluid and fluid-rock interactions of current nanofluids and subsequent oil recovery.

Likewise, whereas environmental protection is a long-standing goal, biomass wastes, one of the most abundant waste materials in the modern world, are highly durable and difficult to degrade. Thus, the development of efficient strategies for the recycling of waste materials has become a major goal across industries.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of preparing an enhanced oil recovery composition. The method may include carbonizing a biomass waste material to provide carbon microparticles, functionalizing the carbon microparticles with a $SO_3$-containing gas such that the carbon microparticles include a hydrophilic surface, and grinding the carbon microparticles to provide carbon nanoparticles, wherein the carbon nanoparticles include a hydrophilic surface and a hydrophobic surface.

In another aspect, embodiments disclosed herein relate to a method of enhanced oil recovery. The method may include introducing an enhanced oil recovery composition including a carbon nanoparticle functionalized with a $SO_3$-containing gas and including a hydrophilic and hydrophobic surface into a hydrocarbon-bearing formation. The method may then include displacing hydrocarbons from the hydrocarbon-bearing formation and recovering the hydrocarbons.

Other aspects and advantages of the claimed subject matter will be apparent from the following description and the appended claims.

DETAILED DESCRIPTION

Recent developments in enhanced oil recovery (EOR) techniques have demonstrated the effective use of nanotechnology in EOR fluids to improve oil recovery. Generally, nanomaterials included in EOR fluid can resist high temperature and pressure in subsurface oil reservoir system and exhibit different surface properties compared to organic molecules in porous media such as reservoir rocks, providing access to oil that is unreachable by surfactants and polymers conventionally used in EOR processes. Based on the specific physical characteristics and properties of a given nanomaterial, additional benefits of using such technology may include the ability to alter the wettability of minerals, decrease the interfacial tension (IFT) at the oil-water interface, change the viscosity of fluids, and/or generate structural disjoining pressure at the oil/rock interface. Specifically, Janus nanomaterials whose surfaces have two or more distinct chemical or physical properties, hold dual nanoparticle and surfactant-like properties. Accordingly, the development of economical and sustainable methods to produce field quantities of low-cost nanomaterials would be very beneficial.

Biomass waste is a natural organic carbon source, mainly composed of organic macro-molecules such as cellulose, hemicellulose, lignin, and proteins. Most of the biomass waste is currently discarded, landfilled or openly burned, which not only leads to a waste of resources but also may cause environmental problems. As biomass waste is renewable, environmentally friendly, and abundantly available, it serves as an innocuous carbon source for carbon nanoparticle production. As EOR nanofluids may exhibit improved oil recovery compared to conventional fluids, carbon nanoparticles derived from biomass waste materials may be used in compositions and methods for EOR. Such compositions and methods would help address two major challenges in the modern world, namely, increasing energy needs and environmental protection. Accordingly, the present invention relates to a method of preparing an EOR composition including carbon nanoparticles from biomass waste materials, as well as a method of EOR using such carbon nanoparticles.

Method of Preparing EOR Composition

In one aspect, embodiments disclosed herein relate to a method of preparing a EOR composition including carbon nanoparticles. In particular, the carbon nanoparticles may be prepared from a biomass waste material, and as such, the method may double as a method for reusing biomass waste material. The method may include carbonizing the biomass waste material to form carbon microparticles, functionalizing the carbon microparticles, and grinding the carbon microparticles to provide Janus carbon nanoparticles with asymmetric surface properties.

Figure 1:
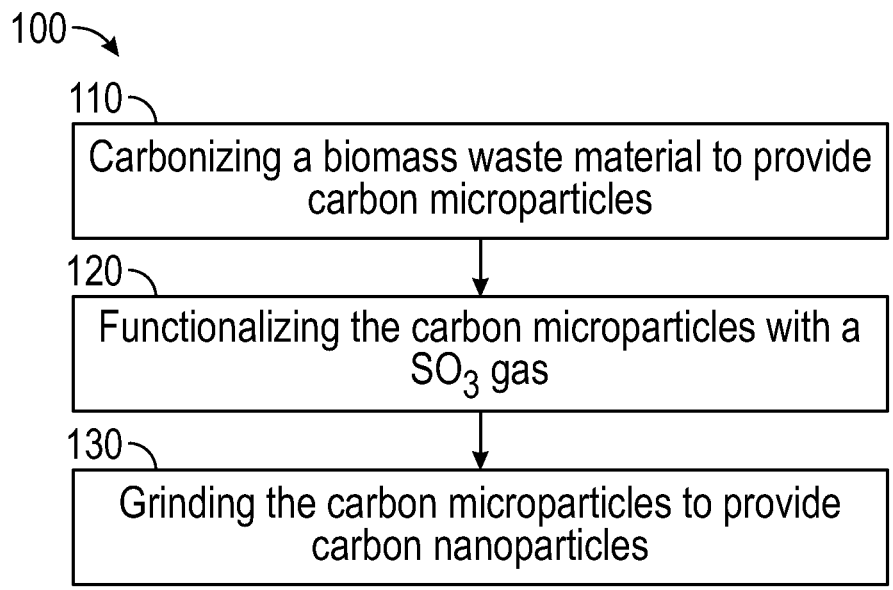
FIG. 1 is a block-flow diagram of a method in accordance with one or more embodiments of the present disclosure.
Figure 2:
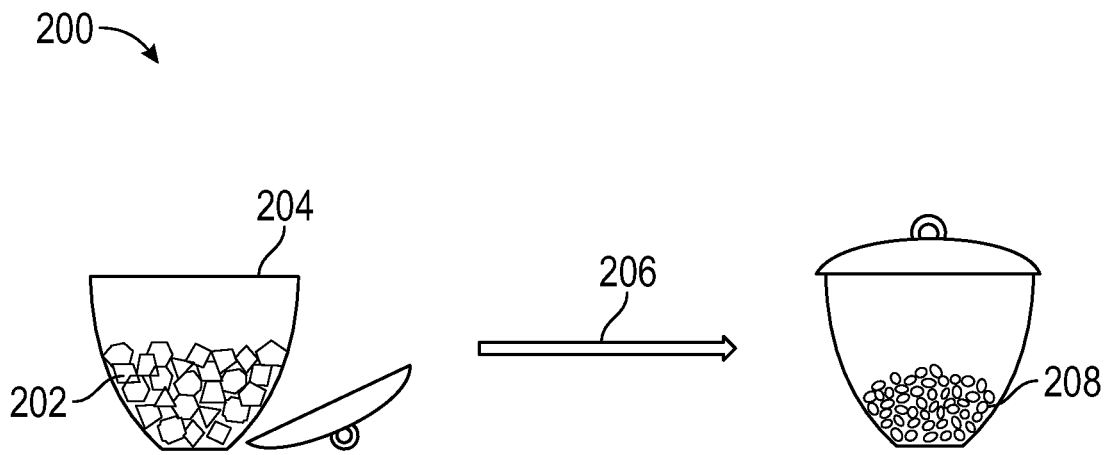
FIG. 2 is a schematic illustration of carbonizing biomass waste material in accordance with one or more embodiments of the present disclosure.
Figure 3:
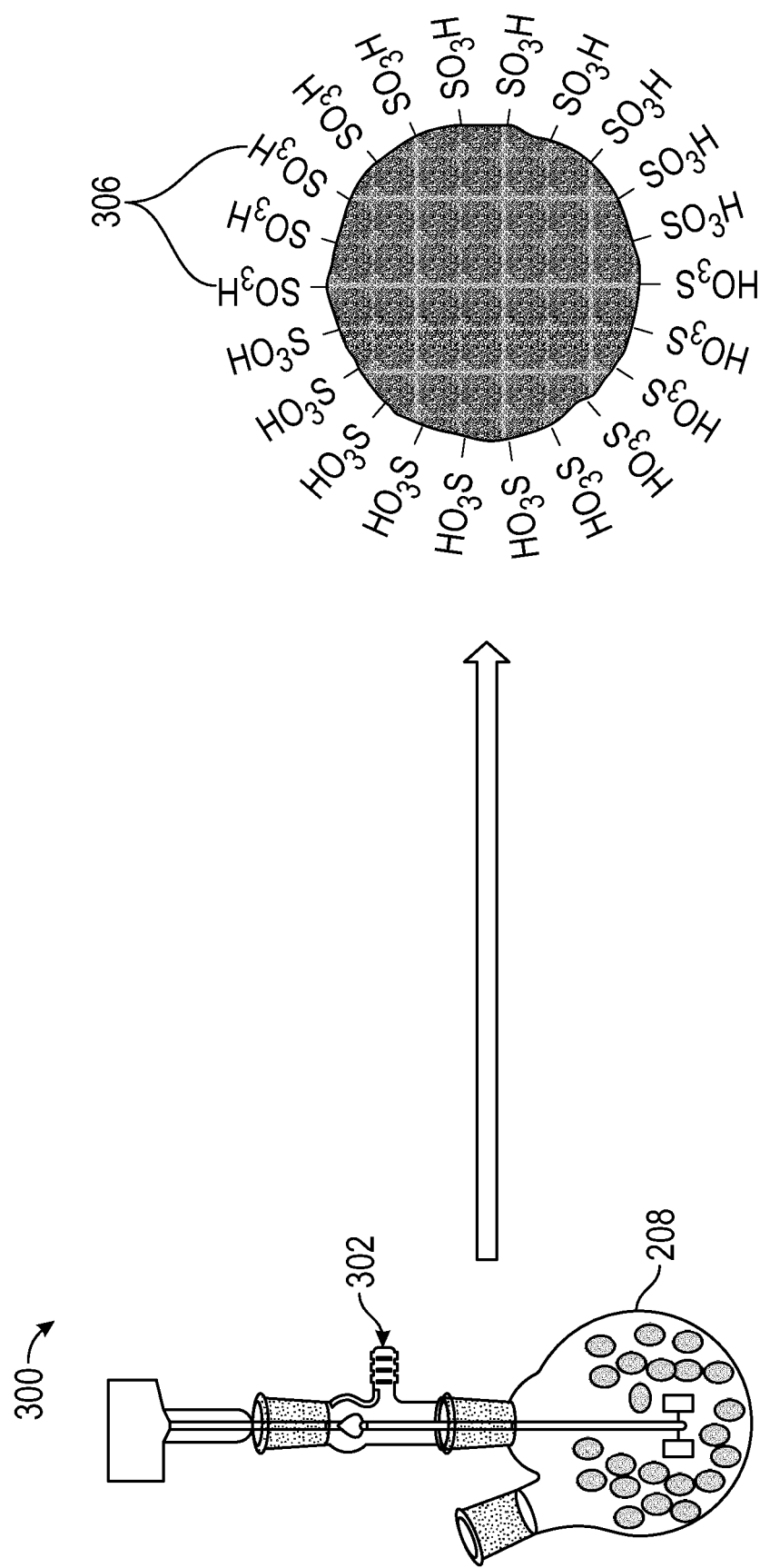
FIG. 3 is a schematic illustration of functionalizing carbon microparticles in accordance with one of more embodiments of the present disclosure.
Figure 4:
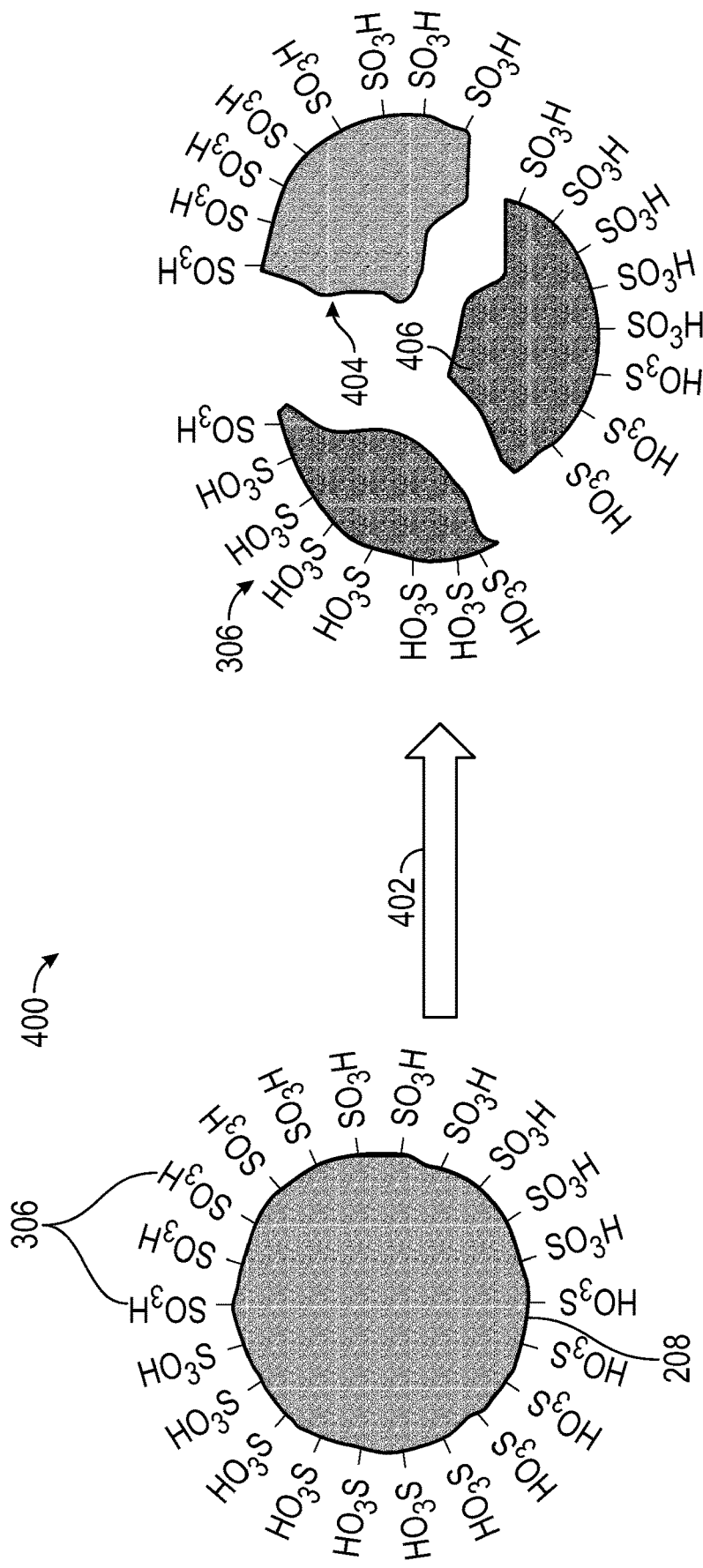
FIG. 4 is a schematic illustration of a carbon nanoparticle before and after grinding in accordance with one or more embodiments of the present disclosure.

A method 100 for preparing an EOR composition including carbon nanoparticles in accordance with one or more embodiments is shown in FIG. 1 and further discussed in FIGS. 2, 3, and 4. Initially, method 100 at block 110 includes carbonizing through a biomass waste material through a pyrolytic process to provide carbon microparticles. As used herein, "carbonize" refers to a process in which a carbon-containing material, such as the aforementioned biomass waste material, is converted or "carbonized" to a material at high temperature under inert atmosphere, or a material that is largely composed of amorphous carbon. Thus, the biomass waste material may be any biomass waste material that contains carbon. The carbon may be in hydrocarbons, aromatic rings, and combinations thereof. Suitable biomass waste materials that may be carbonized include seaweed, algae, coffee, tea leaves, fruit peels, shells of nuts, flour, grains, eggs, oils, animal meats, and combinations thereof. In particular embodiments, the biomass waste material contains molecules of starch, chitin, lignin, cellulose, triglycerides, fatty acids, and combinations thereof.

In one or more embodiments, prior to being carbonized, the biomass waste material is processed to provide dried small pieces of biomass waste material of a dimension equal to less than a millimeter. In some embodiments, the biomass waste material may be a dry powder. The biomass material may be processed by any means known in the art.

FIG. 2, according to one or more embodiments, depicts an exemplary carbonizing process 200. Carbonization of the biomass waste material may be carried out according to any method known in the art. For example, and as shown in FIG. 2, carbonizing 200 biomass waste material 202 may be conducted in a crucible 204. Biomass waste material 202 may be carbonized in a furnace as represented by the arrow 206 in FIG. 2. In one or more embodiments, the biomass waste material is carbonized by heating to an elevated temperature for an amount of time in an inert atmosphere such as nitrogen ($N_2$) or argon (Ar) or under vacuum. The elevated temperature may range from 300 to 550° C. in the carbonization process. For example, in one or more embodiments the biomass waste material is carbonized at an elevated temperature ranging from a lower limit of one of 300, 325, 350, 375, 400, and 425° C. to an upper limit of one of 425, 450, 475, 500, 525, and 550° C., where any lower limit may be paired with any mathematically compatible upper limit.

As described above, the biomass waste material may be heated at the elevated temperature for an amount of time to achieve carbonization. In one or more embodiments, the biomass waste material may be heated for an amount of time ranging from about 15 to about 60 minutes. For example, carbonization of the biomass waste material may take an amount of time ranging from a lower limit of one of 15, 20, 35, 30, and 35 minutes to an upper limit of one of 40, 45, 50, 55, and 60 minutes, where any lower limit may be paired with any mathematically compatible upper limit.

Carbonizing 200 may produce amorphous carbon microparticles 208. Carbonization of the biomass waste material may be confirmed using analytical methods known in the art. In particular, spectroscopies such as Raman spectroscopy, $^1$H NMR spectroscopy, $^{13}$C NMR spectroscopy, infrared (IR) spectroscopy, among others, may be used to characterize the carbonized biomass waste material and confirm the chemical structure.

The carbonized biomass waste material may be further processed to provide a powder. In one or more embodiments, the carbonizing 200 is followed with grinding in an agate mortar or mill to provide a powder or using other grinding methods known in the art. The powder may include particles having an average particle size in the micrometer (µm) range. As such, the powder may also be referred to herein as "carbon microparticles."

Carbon microparticles 208 disclosed herein may have an average particle size of about 5.0 to about 500 µm. The size of particles can be measured by scanning electron microscope (SEM), transmission electron microscope (TEM), or by dynamic light scattering (DLS) method. In one or more embodiments, the carbon microparticles 208 may have an average particles size ranging from a lower limit of one of 5.0, 10, 50, 100, 150, 200, and 250 µm to an upper limit of one of 250, 300, 350, 400, 450 and 500 µm, where any lower limit may be paired with any mathematically compatible upper limit. In particular embodiments, the carbon microparticles 208 have an average particle size of about 10 µm.

Carbon microparticles 208 disclosed herein may have an average surface area of 2 to 50 m$^2$/g. Surface area may be measured using any method known in the art. In one or more embodiments, the surface area is measured with a Brunauer-Emmett Teller (BET) surface analysis technique.

Method 100 at block 120 includes functionalizing the carbon microparticles with a $SO_3$-containing gas. FIG. 3 depicts an exemplary embodiment of functionalizing 300. The carbon microparticles may be functionalized to provide a hydrophilic functionality on the surface of the microparticles. Such a hydrophilic surface 306 may exhibit strong hydrogen bonding ability. Suitable hydrophilic surface 306 functionalities include sulfonates. The carbon microparticles 208 may be functionalized with the $SO_3$-containing gas according to methods known in the art. Functionalizing 300 of the carbon microparticles 208 may include contacting the carbon microparticles with the $SO_3$-containing gas 302. The $SO_3$-containing gas 302 may also include $N_2$ gas. In one or more embodiments, the amount of $SO_3$ gas in the $SO_3$-containing gas is in a range of about 1 wt % to 100 wt %. For example, the amount of $SO_3$ may range from a lower limit of 1, 5, 10, 25, 40, and 50 wt % to an upper limit of 50, 60, 75, 90, and 100 wt %, where any lower limit may be paired with any mathematically compatible upper limit. The $SO_3$-containing gas may be supplied at a flow rate. The flow rate may depend on the size of the carbon microparticles 208 and may range from 0.1 milliliter per minute (mL/min) to 2 mL/min. The carbon microparticles 208 may be stirred using an overhead mixer or by mechanical stirring during functionalizing 300.

In one or more embodiments, the carbon microparticles are combined with $SO_3$-containing gas at an elevated temperature for an amount of time in order to provide the hydrophilic surface functionality. The elevated temperature may range from about 20 to 80° C. For example, in one or more embodiments, functionalization of the carbon microparticles is carried out at an elevated temperature ranging from a lower limit of one of 20, 25, 30, and 40° C. to an upper limit of one of 50, 60, 70, and 80° C., where any lower limit may be paired with any mathematically compatible upper limit.

The carbon microparticles may be combined with $SO_3$-containing gas at such elevated temperature and maintained for a time to provide fully functionalized carbon microparticles. In other words, the functionalization mixture may be maintained for an amount of time such that the entire surface of the resultant carbon microparticles includes a hydrophilic surface functionality. As such, the functionalization may take from 15 to 50 minutes to provide fully functionalized carbon microparticles. For example, in one or more embodiments, the carbon microparticles may be in contact with a functionalizing agent for an amount of time ranging from a lower limit of one of 15, 20, 25, and 30 minutes to an upper limit of one of 35, 40, 45, and 50 minutes, where any lower limit may be paired with a mathematically compatible upper limit.

During functionalization, $SO_3$-containing gas may be released as exhaust gas. The exhaust gas may require neutralization. Neutralization of the exhaust gas may occur through bubbling the exhaust gas into a base. The base may be any strong base capable of neutralization. In one or more embodiments, the base is NaOH or KOH. The base solution may be an aqueous solution. The aqueous solution may be at a concentration of 5 M to 17 M.

After the surface functionalization, the carbon microparticles that were previously hydrophobic can be well-dispersed in water, implying homogeneous functionalization of the carbon surface. The functionalized carbon surface may be confirmed using analytical methods known in the art. In particular, FTIR spectroscopy may be used to characterize the functionalized carbon microparticles in comparison with pristine carbon microparticles. In other embodiments, a Langmuir isotherm, for example a surface pressure-surface area curve or π-A curve, may be measured at the water/air interface with a Langmuir trough.

Method 100 at block 130 further includes grinding the functionalized carbon microparticles. FIG. 4 depicts an exemplary embodiment of a grinding process 400. The grinding process 400 may be conducted using a ball mill, for example. A lubricant may be included in the mixture to be milled in the ball mill. Lubricants may include glycol, ethanol, water, and combinations thereof. The ball mill may also include grinding media. Grinding media may include zirconia, tungsten carbide, silicon carbide, alumina, steel balls, and combinations thereof. The grinding media may have an average diameter that is larger than that of the functionalized carbon microparticles. For example, the particles of the grinding media may have a diameter on the submillimeter or micrometer scale.

Carbon microparticles 208 with a hydrophilic surface 306 may become smaller particles by a milling process such as ball milling 402 as noted above. Ball milling 402 may occur over a time period of 0.5 to 8 hours. In one or more embodiments, the functionalized carbon microparticles are milled for an amount of time ranging from a lower limit of one of 0.5, 1.0, 1.5, 2.0, 2.5, 3.0, 3.5, and 4.0 hours to an upper limit of one of 4.5, 5.0 hours, where any lower limit may be paired with any mathematically compatible upper limit.

Ball milling 402 may be conducted with a milling speed in the range of 2000 to 4000 rpm (rotations per minute). In one or more embodiments, the milling speed may range from a lower limit of one of 2000, 2200, 2400, 2600, 2800, and 3000 rpm to an upper limit of one of 3000, 3200, 3400, 3600, 3800, and 4000 rpm, where any lower limit may be paired with any mathematically compatible upper limit.

As described above, grinding 400 the functionalized carbon microparticles may provide carbon nanoparticles 406. In particular, the carbon nanoparticles 406 are produced by breaking up the functionalized carbon microparticles into smaller, nanosized particles with asymmetric surface functionalization. As the Janus carbon nanoparticles are broken pieces of the functionalized carbon microparticles, they may have a hydrophilic surface 306, originating from the hydrophilic surface of the functionalized carbon microparticles, and a hydrophobic surface 404, originating from the core of the carbon microparticles 208, which is composed of amorphous carbon. Thus, ball milling 402 may produce carbon nanoparticles 406 with both a hydrophilic surface 306 and a hydrophobic surface 404. In one or more embodiments, the hydrophilic surface 306 of the carbon nanoparticles includes a hydrophilic functionality that is the same as the hydrophilic functionality of the functionalized carbon microparticles. On the other hand, the hydrophobic surface 404 of the carbon nanoparticles 406 may be comprised primarily of carbon.

In one or more embodiments, the carbon nanoparticles 406 have an average particle size ranging from about 10 to 2,000 nm, as measured by scanning electron microscopy (SEM). Carbon nanoparticles 406 prepared according to the disclosed method may have an average particle size ranging from a lower limit of one of 10, 50, 100, and 500 nm to an upper limit of one of 600, 1000, 1500 and 2,000 nm, where any lower limit may be paired with any mathematically compatible upper limit. The carbon nanoparticles 406 disclosed herein may have an average surface area of 10 to 500 $m^2/g$.

As described above, Janus carbon nanoparticles in accordance with the present disclosure have a hydrophilic surface and a hydrophobic surface. As such, the disclosed carbon nanoparticles may have unique properties, such as surfactant-like surface properties. For example, as characterized according to Langmuir isotherm, the present carbon nanoparticles may exhibit an adsorption similar to that of conventional surfactants. Surfactants are widely used in enhanced oil recovery for their dual hydrophobic and hydrophilic nature. Accordingly, carbon nanoparticles of one or more embodiments may be beneficial to EOR processes when incorporated in EOR fluid compositions.

Embodiments disclosed herein also relate to a composition for EOR. The composition may include a nanomaterial and an aqueous-based fluid. In one or more embodiments, the nanomaterial in the EOR composition is the carbon nanoparticles described above.

The EOR composition may include the Janus carbon nanoparticles in an amount ranging from about 0.001 wt % (weight percent) to about 3.0 wt % based on the total weight of the EOR composition. For example, in one or more embodiments, Janus carbon nanoparticles are present in the EOR nanofluid in an amount ranging from a lower limit of one of 0.001, 0.005, 0.01, 0.05, and 0.1 wt % to an upper limit of one of 0.5, 1.0, 1.5, 2.0, 2.5, and 3.0 wt %, where any lower limit may be paired with any mathematically compatible upper limit.

In one or more embodiments, the EOR composition includes an aqueous-based fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

In one or more embodiments, the EOR composition includes water in a range of from about 97 wt % to 99.9 wt % based on the total weight of the EOR composition. In one or more embodiments, the water used for the EOR composition may have an elevated level of salts or ions versus fresh water, such as salts or ions naturally present in formation water, production water, seawater, and brines. Without being bound by any particular mechanism or theory, increasing the saturation of water by increasing the salt concentration or other organic compound concentration in the water may increase the density of the water, and thus, the EOR composition. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, iron, copper, strontium, silicon, lithium, chlorides, bromides, carbonates, iodides, chlorates, bromates, formates, nitrates, sulfates, phosphates, hydroxides, and fluorides, and combinations thereof.

In one or more embodiments, the EOR composition includes one or more salts in an amount that ranges from about 0 to about 225,000 ppm (parts per million) in TDS (total dissolved solids). For example, the EOR composition may contain the one or more salts in an amount ranging from a lower limit of any of 0, 5,000, 10,000, 20,000, 30,000, 50,000, 75,000, 100,000 and 125,000 ppm to an upper limit of any of 125,000, 150,000, 175,000, 200,000, and 225,000 ppm, where any lower limit can be used in combination with any mathematically compatible upper limit.

In one or more embodiments, the EOR composition includes one or more additives. Any additives known in the art for EOR compositions may be used. Examples of such additives include but are not limited to surfactants, polymers, stabilizers, and/or mixtures thereof. In one or more embodiments, additives may be included in the EOR composition in an amount ranging from 0 to about 3 wt % based on the total weight of the EOR composition.

In one or more embodiments, the EOR nanofluid may be characterized according to several properties, such as, for example, viscosity, density, and homogeneity. Further, the presence of the carbon nanoparticles in the fluid, may result in a decreased interfacial tension between the EOR fluid and the oil within a reservoir.

Enhanced Oil Recovery Method

In another aspect, embodiments of the present disclosure relate to a method of enhanced oil recovery using an enhanced oil recovery composition described above. The method may include introducing an enhanced oil recovery composition into a hydrocarbon-bearing formation, displacing hydrocarbons from the hydrocarbon-bearing formation, and recovering the hydrocarbons.

Figure 5:
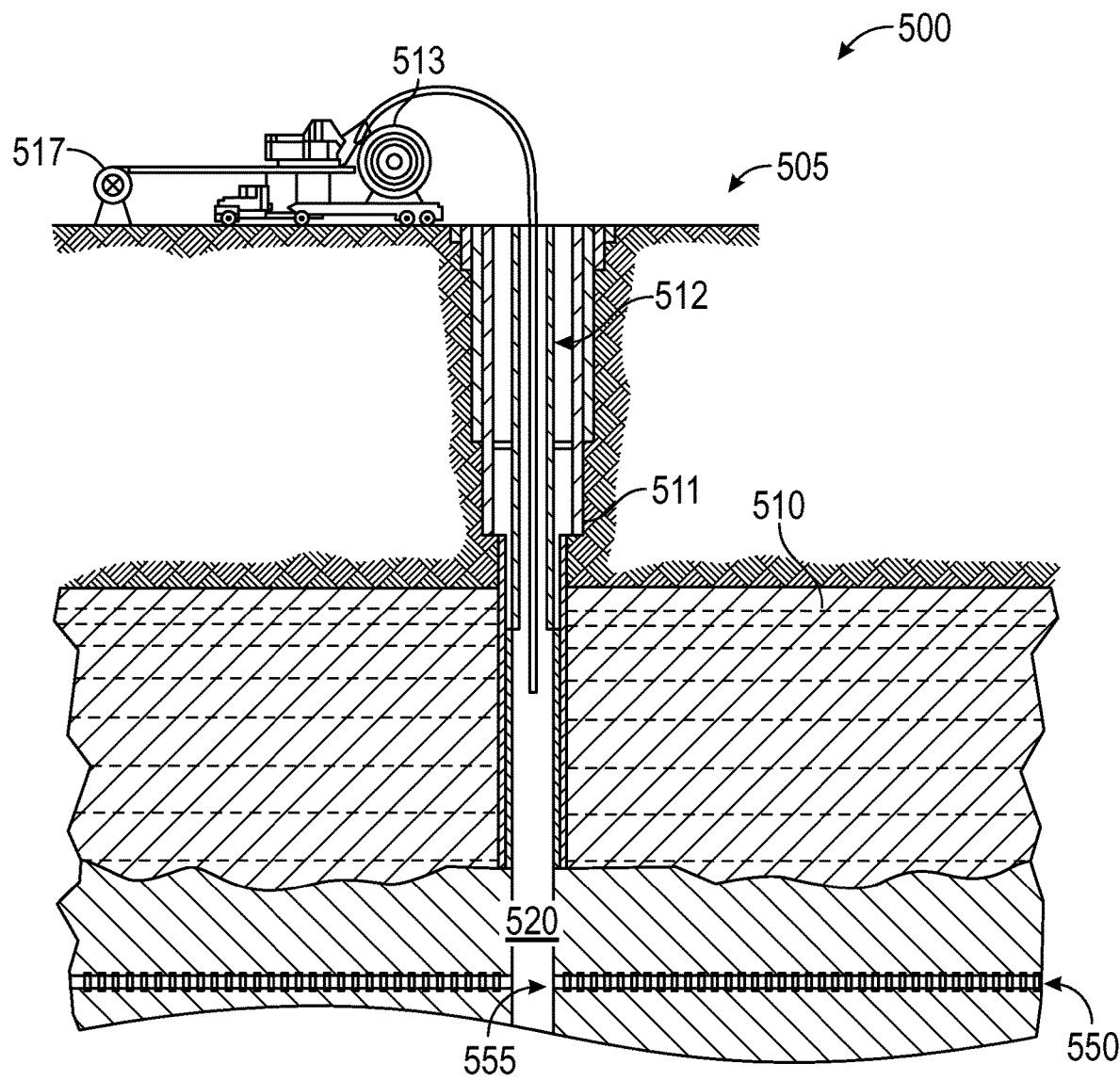
FIG. 5 is a schematic illustration of a well environment in accordance with one or more embodiments of the present disclosure.

FIG. 5 depicts a well environment 500 in accordance with one or more embodiments. Well environment 500 includes a subsurface 510. Subsurface 510 is depicted having a wellbore wall 511 both extending downhole from a surface 505 into the subsurface 510 and defining a wellbore 520. The subsurface 510 also includes target formation 550 to be treated. Target formation 550 has target formation face 555 that fluidly couples target formation 550 with wellbore 520 through wellbore wall 511. In this case, casing 512 and coiled tubing 513 extend downhole through the wellbore 520 into the subsurface 510 and towards target formation 550. With the configuration in FIG. 5, the previously described embodiment that comprises the enhanced oil recovery composition may be introduced into the subsurface 510 and towards target formation 550 via a pump 517 through the coiled tubing 513.

Figure 6:
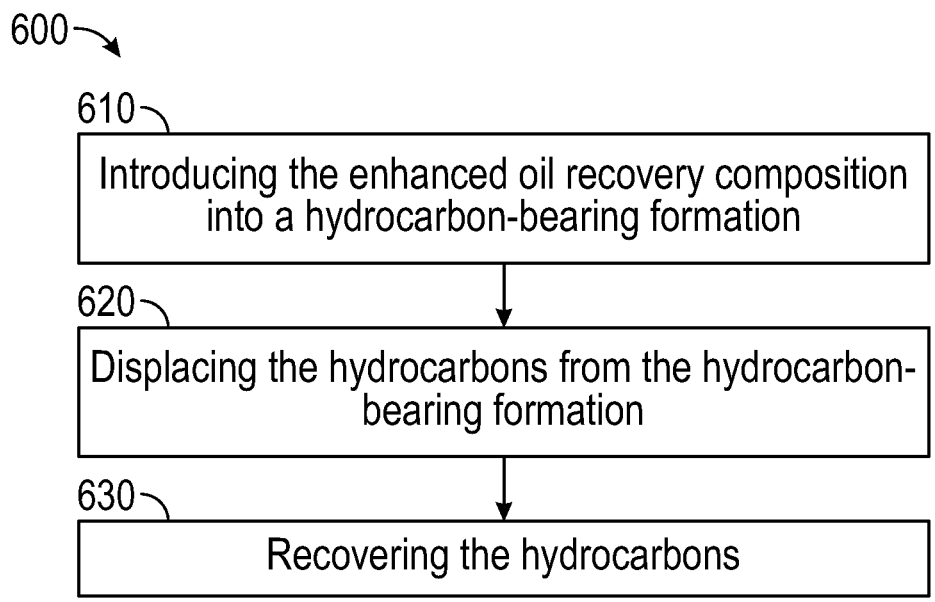
FIG. 6 is a block-flow diagram of a method in accordance with one or more embodiments of the present disclosure.

A method, 600, in accordance with the present disclosure is shown in, and discussed with reference to, FIG. 6. Initially, in step 610, an enhanced oil recovery composition is introduced into a hydrocarbon-bearing formation. In one or more embodiments, the EOR composition is introduced into the subsurface 510 of the target formation 550. The EOR nanofluid is as previously described. The hydrocarbon-bearing formation may include oil. In one or more embodiments, the hydrocarbon-bearing reservoir has already been depleted of about a third of its hydrocarbon content.

In method 600, step 620 includes displacing the hydrocarbons in the hydrocarbon-bearing foundation. The hydrocarbon may be displaced using the disclosed EOR composition. In one or more embodiments, the Janus carbon nanoparticles may have a surfactant-like surface property in the EOR composition. Accordingly, disclosed Janus carbon nanoparticles may reside at the oil-water interface or at the rock-fluid interface downhole, and thus may increase the hydrocarbon mobility or alter the wettability of reservoir rock, resulting in increased hydrocarbon displacement.

Step 630 in method 600 includes recovering the hydrocarbons. As described above, in the presence of the disclosed EOR composition, the hydrocarbons may have an increased mobility and thus an increased hydrocarbon recovery from the formation. Method 600 may result in greater recovery of oil initially in place (OIIP).

Embodiments of the present disclosure may provide at least one of the following advantages. Current methods known in the art for sulfonation tend to use acid treatments for functionalization. The acids may be $H_2SO_4$ and $HNO_3$. Methods using acids tend to produce an excessive amount of liquid waste. Additionally, methods using acids tend to require filtration procedures to separate the functionalized material from the acids. In contrast, methods using $SO_3$-containing gas, as described herein, do not produce any liquid waste. Further, methods using $SO_3$-containing gas do not require any filtration procedures after functionalization.

EXAMPLES

Example 1: Synthesis of Carbon Microparticles from Chitin

In a typical synthesis, about 10 grams of chitin fine powder (in millimeter and submillimeter size) was placed in a crucible. After heating at 450° C. for 30 minutes under $N_2$ atmosphere, the resulting carbon black powder was collected. By grinding in an agate mortar, the carbon powder can be easily broken down to size in a 20-250 micrometer range, i.e. carbon microparticles.

Example 2: Synthesis of Carbon Microparticles from Banana Peels

In a typical synthesis, banana peels were dried at 100° C. in oven under air, and then 10 grams of the dried banana peels were ground into fine powder (in millimeter and submillimeter size) and transferred into a crucible. After heating at 450° C. for 30 minutes under $N_2$ atmosphere, the resulting carbon black powder was collected. By grinding in an agate mortar, the carbon powder can be easily broken down to size in a 20-250 micrometer range, i.e., carbon microparticles.

Example 3: Synthesis of Carbon Microparticles from Waste Coffee Powder

In a typical synthesis, waste coffee powder was dried at 100° C. in oven under air, and then 10 grams of the dried coffee powder was ground into fine powder (in millimeter and submillimeter size) and transferred into a crucible. After heating at 450° C. for 30 minutes under $N_2$ atmosphere, the resulting carbon black powder was collected. By grinding in an agate mortar, the carbon powder can be easily broken down to size in a 20-250 micrometer range, i.e., carbon microparticles.

Figure 7:
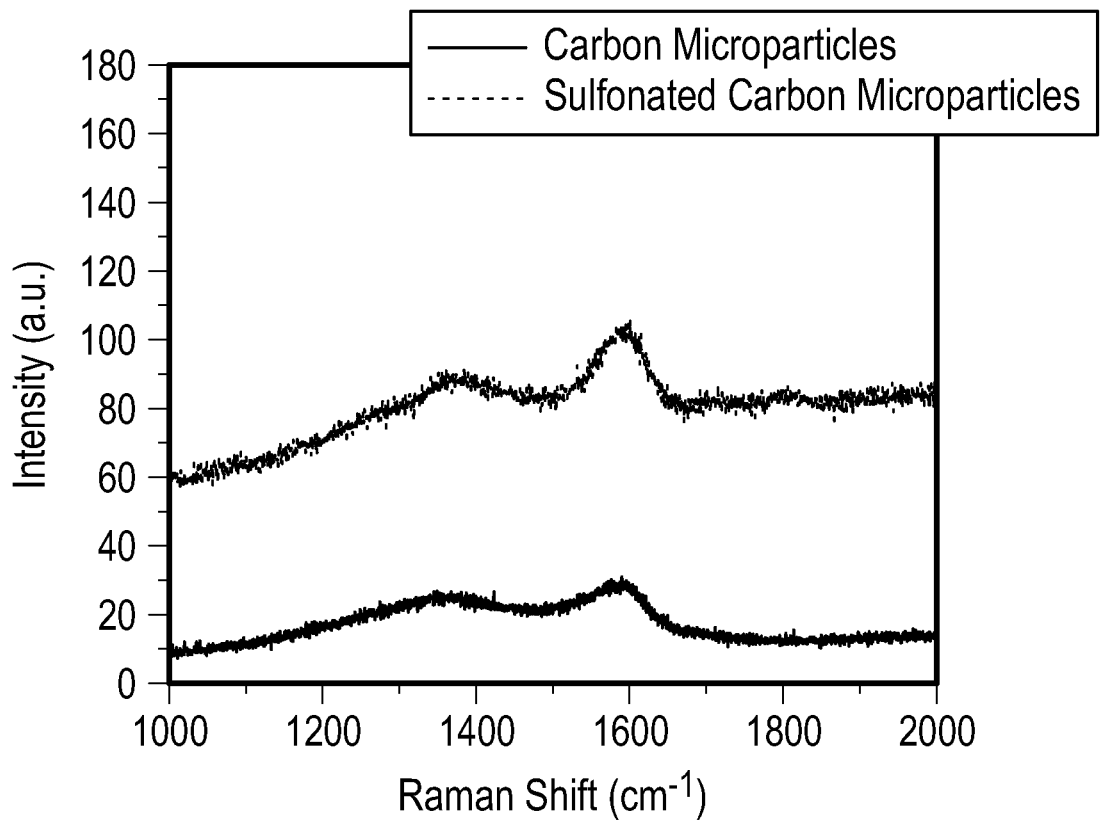
FIG. 7 is a Raman spectrum of carbon microparticles in accordance with one or more embodiments of the present disclosure.

The formation of carbon structures in above examples 1-3 has been confirmed by Raman spectroscopic analysis with characteristic D-band at around 1365 cm$^{-1}$ and G-band at around 1605 cm$^{-1}$, as shown in FIG. 7.

Example 4: Functionalizing of Carbon Microparticles

Carbon microparticles were placed in a flask (2 grams of carbon microparticles) as demonstrated on FIG. 3 and the temperature was maintained at 50° C. $SO_3$ gas along with the $N_2$ gas was then introduced into the flask at 0.1 mL/min (50/50 ratio of each gas) while carbon microparticles were mixed using external overhead mixer. Exhaust gas was neutralized in a base bath through bubbling into aqueous NaOH. Then the reaction was run for 15 minutes, and carbon microparticles were washed, filtered, and dried.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of preparing an enhanced oil recovery composition comprising:
   carbonizing a biomass waste material to provide carbon microparticles;
   functionalizing the carbon microparticles with a $SO_3$-containing gas such that the carbon microparticles comprise a hydrophilic surface; and
   grinding the functionalized carbon microparticles to provide carbon nanoparticles, wherein the carbon nanoparticles comprise a hydrophilic surface and a hydrophobic surface.

2. The method of claim 1, further comprising mixing the carbon nanoparticles with an aqueous-based fluid to provide an enhanced oil recovery fluid.

3. The method of claim 2, wherein the aqueous-based fluid is water, seawater, or brine.

4. The method of claim 2, wherein the aqueous-based fluid comprises one or more additives selected from a group consisting of surfactant, stabilizers, and combinations thereof.

5. The method of claim 2, further comprising:
   introducing the enhanced oil recovery fluid into a hydrocarbon-bearing formation;
   displacing hydrocarbons from the hydrocarbon-bearing formation; and
   recovering the hydrocarbons.

6. The method of claim 5, wherein the carbon nanoparticles are present in the enhanced oil recovery fluid in an amount ranging from 0.001 to 3.0 wt %.

7. The method of claim 1, wherein the biomass waste material comprises a biomass waste selected from a group consisting of seaweed, algae, coffee, tea leaves, fruit peels, shells of nuts, and combinations thereof.

8. The method of claim 1, wherein the biomass waste material comprises a molecule selected from a group consisting of starch, chitin, lignin, cellulose, and combinations thereof.

9. The method of claim 1, wherein carbonizing the biomass waste material comprises heating the biomass waste material at a temperature of a range of 300 to 550° C. for a period of 15 to 60 minutes under an inert atmosphere.

10. The method of claim 1, wherein the carbon microparticles have an average particle size ranging from 5 to 500 µm.

11. The method of claim 1, wherein functionalizing the carbon microparticles with the $SO_3$-containing gas comprises heating the carbon microparticles at a temperature in a range of 20 to 80° C.

12. The method of claim 11, wherein functionalizing the carbon microparticles further comprises supplying the $SO_3$-containing gas at a flow rate in a range of 0.1 to 2 mL/min.

13. The method of claim 11, where functionalizing the carbon microparticles with the $SO_3$-containing gas further comprises heating for an amount of time ranging from 15 to 50 minutes.

14. The method of claim 1, wherein the hydrophilic surface functionality is a sulfonate.

15. The method of claim 1, wherein grinding the carbon microparticles comprises ball milling the carbon microparticles for a time period of 0.5 to 8 hours with a speed of 2000 to 4000 rpm (rotations per minute).

16. The method of claim 1, wherein the carbon nanoparticles have an average particle size ranging from 10 to 2,000 nm.

* * * * *